No. 637,928. Patented Nov. 28, 1899.
E. B. FENBY.
COIN ACTUATED WEIGHING MACHINE.
(Application filed July 5, 1899.)

(No Model.) 3 Sheets—Sheet 1.

WITNESSES:

INVENTOR
Edgar Beverly Fenby
BY
ATTORNEYS

No. 637,928. Patented Nov. 28, 1899.
E. B. FENBY.
COIN ACTUATED WEIGHING MACHINE.
(Application filed July 5, 1899.)
(No Model.) 3 Sheets—Sheet 2.
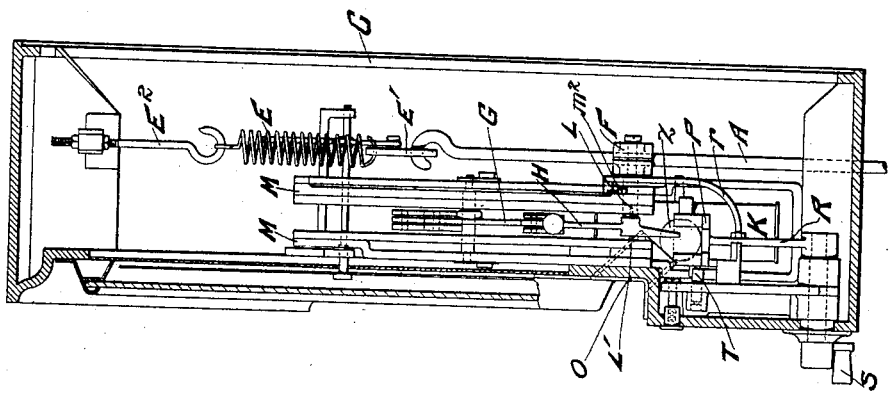
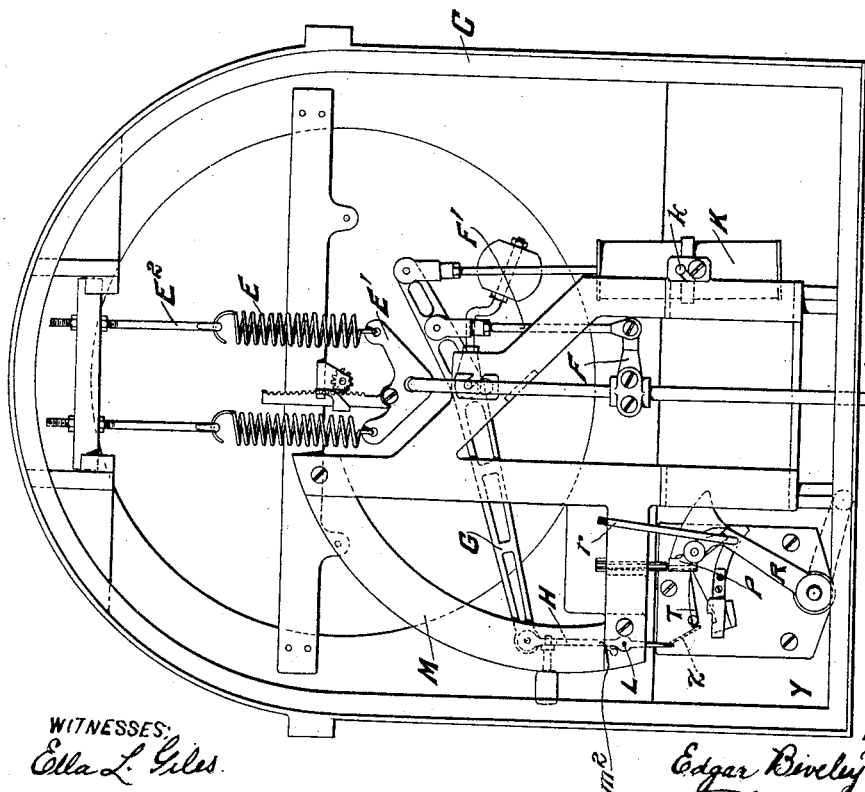
WITNESSES:
Ella L. Giles.
INVENTOR
Edgar Beverly Fenby.
BY
Richards
ATTORNEYS
THE NORRIS PETERS CO., PHOTO-LITHO., WASHINGTON, D. C.

No. 637,928. Patented Nov. 28, 1899.
E. B. FENBY.
COIN ACTUATED WEIGHING MACHINE.
(Application filed July 5, 1899.)
(No Model.) 3 Sheets—Sheet 3.

WITNESSES: INVENTOR
Edgar Bewley Fenby.
BY
Richardson
ATTORNEYS.

THE NORRIS PETERS CO., PHOTO-LITHO., WASHINGTON, D. C.

UNITED STATES PATENT OFFICE.

EDGAR BEVERLEY FENBY, OF LONDON, ENGLAND, ASSIGNOR TO GEORGE CROYDON MARKS, OF SAME PLACE.

COIN-ACTUATED WEIGHING-MACHINE.

SPECIFICATION forming part of Letters Patent No. 637,928, dated November 28, 1899.

Application filed July 5, 1899. Serial No. 722,857. (No model.)

*To all whom it may concern:*

Be it known that I, EDGAR BEVERLEY FENBY, engineer, a subject of the Queen of Great Britain and Ireland, residing at 55 Nightingale road, Harlesden, London, in the county of Middlesex, England, have invented certain new and useful Improvements in Coin-Actuated Weighing-Machines, (for which I have made an application for Letters Patent in Great Britain, No. 8,256, dated the 19th day of April, 1899,) of which the following is a specification.

This invention relates to improvements in connection with coin-actuated or penny-in-the-slot weighing-machines, the object being to produce a machine the weighing mechanism of which will not be actuated immediately the person stands upon the platform, but will only be capable of motion after a coin has been inserted in the machine.

In many weighing-machines at present in use the weighing mechanism is quite independent of the recording mechanism and upon any person standing upon the platform of the machine the weighing mechanism is actuated and remains fixed at a point dependent upon the weight of the person ready for determining the extent of the motion of the indicating-hand of the recording mechanism after a coin has been inserted in the slot of the machine to release such recording or indicating mechanism. By this arrangement of double mechanism, one part of which is outside of the control of the coin and capable of being actuated immediately any load or pressure is placed upon the platform, much needless wear and tear of the mechanism are occasioned. By my improved arrangement of mechanism I release or unlock the weighing members of the mechanism after a coin only has been inserted, and I thus obviate the constant wear and tear which arise by the interference or meddling with the machine by persons who do not place coins within it.

Figure 1:
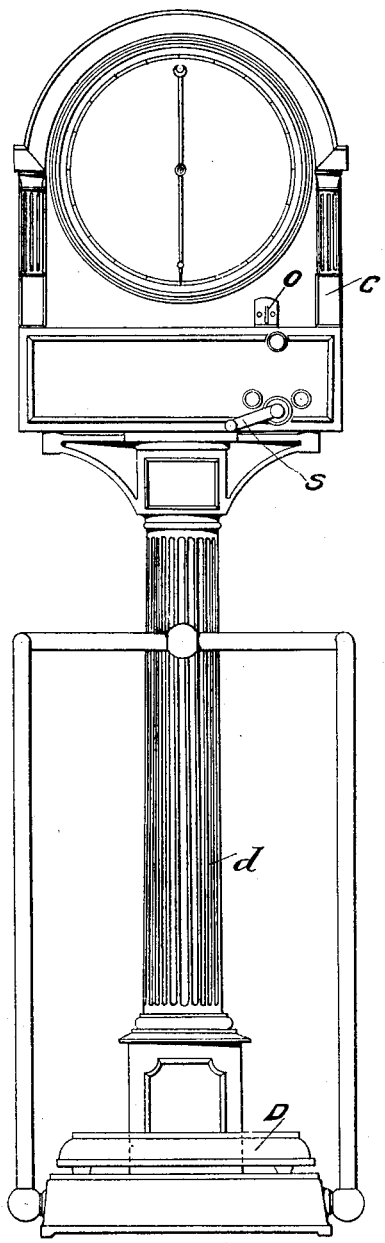
Figure 2:
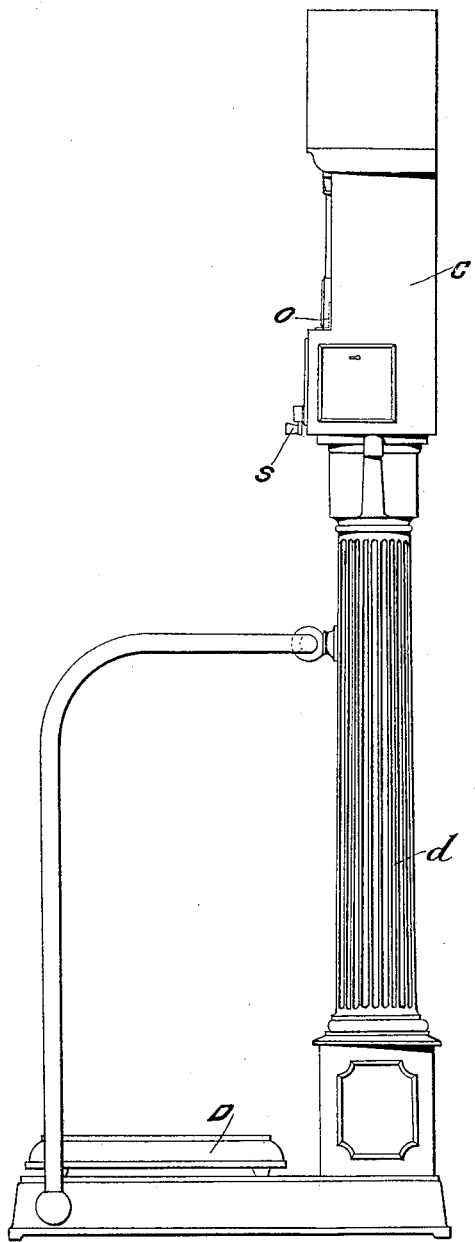
Figure 5:
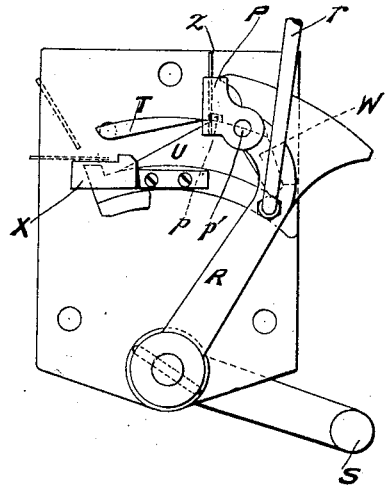
Figure 6:
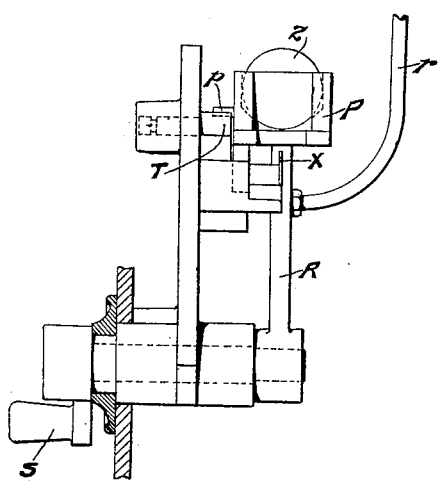
Figures 7, 8:
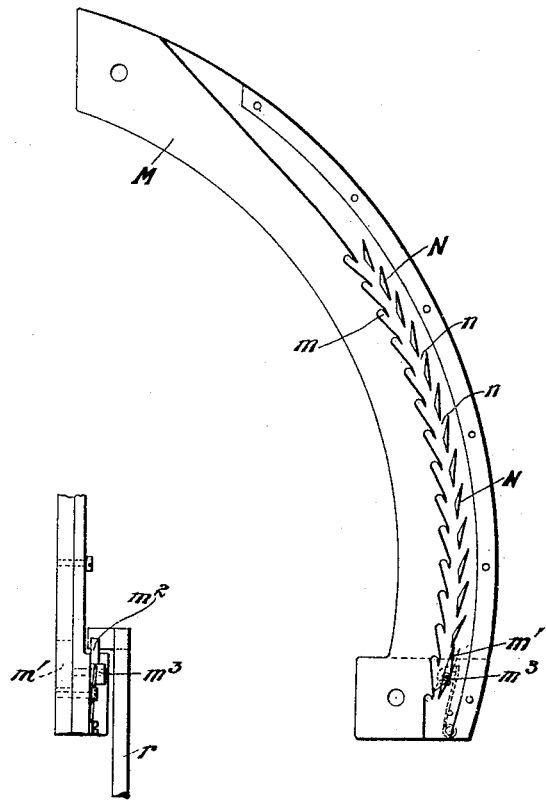

In the accompanying sheets of explanatory drawings, Figure 1 is a front elevation, and Fig. 2 a side elevation, of a convenient form of my improved weighing-machine. Fig. 3 is a detail elevation of the weighing and recording mechanism seen by the removal of the back cover-plate of the dial-head of the machine; and Fig. 4 is a sectional and side elevation of the same, taken through the casing of the dial-head of the machine. Fig. 5 is an enlarged elevation, and Fig. 6 a side elevation, of the coin-hopper and its connections. Fig. 7 is an enlarged detail elevation of the rack-path and pin-guide, and Fig. 8 is a part end elevation showing the movable shutter or end stopping-tooth for diverting the pin to the outside path.

In carrying my invention into effect I employ the coin to trip or release a lever which permits the pull of the rod from the platform weighing-lever-mechanism connection to become operative upon the indicating mechanism which is carried in the upper portion C of the machine case or cabinet.

The platform-casing D and its steelyard connections I make in any well-known manner, carrying a vertical rod or connecting-bar A from the lower member of the weighing-platform to the upper portion of the mechanism placed in one convenient arrangement behind the dial-face. I carry this rod or connecting-bar up the vertical pillar $d$ of the machine or up the casing when such is a continuous one from the base to the dial-head, and to the upper end of the rod I make the usual weighing-spring connection E E' E² for taking the pull or tension of the rod. To this tension-rod A, I make a connection F' with my locking-mechanism by means of a coupling or link-plate F, which transmits the tension from the rod to one side of the lever G, which carries at its outer end a weighted trigger-locking catch H. At or near one extreme end of this main or locking lever G, I make a connection to a dash-pot or buffer-piston and cylinder K for the purpose of preventing too violent a motion to be given to the lever G under the impulse of the tension-rod A. I prefer to pivot the cylinder upon trunnion-like bearings $k$ to enable an automatic adjustment to be made for the vibrating motion of the locking or tripping lever G. On the opposite end of the lever G, I suspend a pawl-like trigger-locking catch H, which is provided with a projecting pin or pins L L' for engaging with ratchetshaped teeth or serrations $m$, formed in a guide quadrant bar or bars M, against or between which the end of the locking-lever G travels. Upon the quadrant guide-bars M, I arrange notched or serrated outer bars of I form and on the main bar specially-shaped teeth N and openings $n$, which admit of the projecting stop-pins L L' passing freely over in the upward direction when the lever G is moving forward, but which will not allow of a backward or return motion to be made with the pin L on the outer face of N. When the lever G reaches the point where it remains stationary under the influence of any particular load upon the platform or foot-plate, then the suspended locking-lever H falls from the outer notched path N through one of the openings or notches $n$ onto the inner quadrant ratchet-guide, and the pin or pins engage beneath one of the teeth or pair of teeth $m$, thereby preventing any further onward movement of the lever, thus preventing additional weighing being attempted on the machine. Upon the person alighting from the platform the end of the locking-lever G falls and carries with it the suspending locking-carrier H, the teeth $m$ of the inner quadrant-guide being suitably shaped to allow of a backward but not a forward movement.

The coin-actuating mechanism I arrange within the casing in such a manner that a coin which is passed through an outer slot O falls onto a rocking hopper-like end P of a pivoted lever R, the spindle of this lever having on the outside of the casing a handle S or knob for manipulation by the person inserting the coin.

On the rocking coin hopper or carrier is arranged a projecting stud or pin $p$, which travels over a pivoted outer guide T and which keeps the coin Z within the carrier P while the stud is traveling over the guide. When the end of this guide T is reached, the hopper or carrier P brings the coin into contact with the end of the lever H, as shown in Fig. 3, thus releasing the end by causing the pin L to be removed from contact with the lower teeth and allows the coin Z to fall out onto the plate X, whence it falls into the receptacle Y below, arranged within the casing. The hopper P is then in a position to be moved backward to its initial position, the stud $p$ passing backward beneath the surface of the pivoted guide T, which has placed beneath it for this purpose a directing fixed guide-bar U, so that when the pin reaches the inner end of its stroke the pivoted guide T moves upon its pivot to allow the guide to pass under, and thus to assume its initial vertical position, with the pin above the guide ready for the reception of another coin.

I may make my handle of such a weight that it tends normally to return the hopper to its initial coin-receiving position or I may employ a spring or balance-weight for this purpose. I provide a tail-locking pawl W upon my coin-hopper for engaging in a stop or tooth of a guide-plate, which I place upon my casing for determining the length of the travel of the handle in each direction.

At the lower end of the outer rack N, I arrange a swiveling tooth or shutter $m'$, which admits of the passage to the inner or down path being closed to the upward movement of the pin L on the locking-lever H; but on the downward movement of the pin, when it is on the inner or under side of the teeth N and traveling over the serrations in the shutter or swiveling tooth, is free to pass, so as to enter the lowest or the zero-locked serration or tooth of the bar or guide M. Upon the hopper-lever R, I place a striker-bar $r$, which presses against the arm $m^2$, attached to the spindle $m^3$, on which the shutter or swiveling tooth $m'$ pivots or turns. The pressure of the striking-bar against the arm $m^2$ causes the shutter to close the inner passage, and so cause the pin L to travel upward on the outer guide-teeth or rack-surface N.

I employ the ordinary rock-and-pinion action for giving motion to the indicating hand or pointer for indicating the weight upon the face of the dial as at present arranged upon the ordinary personal weighing-machines, modifying the connections and parts to suit the new mechanism I introduce when constructing my improved machine.

The case and platform of my machine I construct of a shape and configuration to suit any particular requirement.

Having thus described my invention, what I claim as new, and desire to secure by Letters Patent, is—

1. In a coin-actuated weighing-machine, the combination with the motion-rod A and main lever G, of a coin-tripped locking-lever pivoted to the main lever, a quadrant-guide having teeth, and a pin carried by said coin-tripped lever and coacting with said quadrant, substantially as described.

2. In a coin-actuated weighing-machine, the combination with the motion-rod A and main lever G, of a coin-tripped locking-lever pivoted to the main lever, a toothed quadrant adapted to be engaged by said locking-lever, a pivoted coin-carrying hopper arranged to receive a coin and convey the same into releasing contact with said lever, and a handle for operating said coin-hopper, substantially as described.

3. In a coin-actuated weighing-machine, the combination with the locking-lever, of a pivoted coin-carrying hopper, a pin or stud carried thereby, a pivoted guide coacting with said stud for maintaining said hopper in its upright position during its movement in one direction and permitting it to tilt at the end to dump the coin, and a fixed guide coacting with said stud on the return movement to restore it to normal position, substantially as described.

4. In a coin-actuated weighing-machine, the combination with the motion-rod and main lever, of a locking-lever having a laterally-projecting pin, a quadrant-guide for said pin having inner and outer teeth forming two channels, said outer teeth being arranged to permit the pin to drop through to the inner teeth on the cessation of the movement of the main lever, substantially as described.

In witness whereof I have hereunto set my hand in presence of two witnesses.

EDGAR BEVERLEY FENBY.

Witnesses:
HERBERT BOWKETT,
JOHN BELSEY.